US010033034B2

(12) United States Patent
Niu et al.

(10) Patent No.: US 10,033,034 B2
(45) Date of Patent: Jul. 24, 2018

(54) SULFUR NANOSPONGE CATHODE FOR LITHIUM—SULFUR BATTERY AND METHODS OF MANUFACTURE THEREOF

(71) Applicant: Massachusetts Institute of Technology, Cambridge, MA (US)

(72) Inventors: Junjie Niu, Malden, MA (US); Akihiro Kushima, Arlington, MA (US); Chao Wang, Cambridge, MA (US); Ju Li, Weston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 70 days.

(21) Appl. No.: 14/853,610

(22) Filed: Sep. 14, 2015

(65) Prior Publication Data

US 2016/0190558 A1  Jun. 30, 2016

Related U.S. Application Data

(60) Provisional application No. 62/049,685, filed on Sep. 12, 2014.

(51) Int. Cl.
| | |
|---|---|
| H01M 4/36 | (2006.01) |
| H01M 4/136 | (2010.01) |
| H01M 4/38 | (2006.01) |
| H01M 4/62 | (2006.01) |
| H01M 10/052 | (2010.01) |
| H01M 10/0569 | (2010.01) |
| H01M 4/04 | (2006.01) |
| H01M 4/587 | (2010.01) |
| H01M 10/0525 | (2010.01) |
| H01M 10/0568 | (2010.01) |
| H01M 4/02 | (2006.01) |

(52) U.S. Cl.
CPC ......... *H01M 4/366* (2013.01); *H01M 4/0402* (2013.01); *H01M 4/136* (2013.01); *H01M 4/38* (2013.01); *H01M 4/386* (2013.01); *H01M 4/387* (2013.01); *H01M 4/587* (2013.01); *H01M 4/624* (2013.01); *H01M 4/625* (2013.01); *H01M 10/052* (2013.01); *H01M 10/0525* (2013.01); *H01M 10/0568* (2013.01); *H01M 10/0569* (2013.01); *H01M 2004/028* (2013.01); *H01M 2220/20* (2013.01); *H01M 2220/30* (2013.01); *H01M 2300/0028* (2013.01); *Y02T 10/7011* (2013.01)

(58) Field of Classification Search
CPC .... H01M 4/049; H01M 4/0497; H01M 4/139; H01M 4/366; H01M 4/38; H01M 4/60; H01M 4/625; H01M 4/0402; H01M 4/133; H01M 4/136; H01M 4/28; H01M 4/386; H01M 4/387; H01M 4/587; H01M 4/624

See application file for complete search history.

(56) References Cited

U.S. PATENT DOCUMENTS

| | | | |
|---|---|---|---|
| 5,532,077 A | 7/1996 | Chu | |
| 2007/0287060 A1* | 12/2007 | Naoi | H01M 4/38 429/122 |
| 2013/0164625 A1* | 6/2013 | Manthiram | H01M 4/13 429/231.8 |
| 2013/0183548 A1* | 7/2013 | Kourtakis | H01M 4/366 429/50 |
| 2014/0099536 A1* | 4/2014 | Sun | H01M 10/0569 429/188 |
| 2014/0255795 A1 | 9/2014 | Manthiram et al. | |

FOREIGN PATENT DOCUMENTS

KR  2003-0081778  * 10/2003

OTHER PUBLICATIONS

Machine English translation of KR 2003-0081778, published on Oct. 22, 2003 (Year: 2003).*
Anderson, J. L. et al., "Diffusion of spherical macromolecules at finite concentration," *J. Chem. Phys.* 64, pp. 3240-3250 (1976).
Barchasz, C. et al., "Lithium/Sulfur Cell Discharge Mechanism: An Original Approach for Intermediate Species Identification," *Anal. Chem.* 84, pp. 3973-3980 (2012).
Bruce, P. G. et al., "Li—O2 and Li—S batteries with high energy storage," *Nat. Mater.* 11, pp. 19-29 (2012).
Chen, L. et al., "Recent advances in lithium-sulfur batteries," *Journal of Power Sources* 267, pp. 770-783 (2014).
Cheon, S. E. et al., "Rechargeable Lithium Sulfur Battery II. Rate Capability and Cycle Characteristics," *J. Electrochem. Soc.* 150, pp. A800-A805 (2003).
Dondos, A. et al., "A new representation of viscosity data as a function of molecular weight," *Polymer* 18, pp. 1161-1162 (1977).
Fu, Y. Z. et al., "Core-shell structured sulfur-polypyrrole composite cathodes for lithium-sulfur batteries," *Rsc. Adv.* 2, pp. 5927-5929 (2012).
González-Martín, M. L. et al., "Determination of the Carbon Black Surface Free Energy Components from the Heat of Immersion Measurements," *Langmuir* 13, pp. 5991-5994 (1997).
Imery's Graphite & Carbon, "Specialty Carbons for the Positive Electrode of Lithium-ion Batteries," 8 pp. (2014).
International Search Report and Written Opinion dated Mar. 4, 2016 from corresponding International Application No. PCT/US15/50028, 7 pages.
Jayaprakash, N. et al., "Porous Hollow Carbon Sulfur Composites for High-Power Lithium-sulfur Batteries," *Angew. Chem.-Int. Edit.* 50, pp. 5904-5908 (2011).
Ji, X. et al., "A highly ordered nanostructured carbon-sulphur cathode for lithium-sulphur batteries," *Nat. Mater.* 8, pp. 500-506 (2009).
Liang, X. et al., "A nano-structured and highly ordered polypyrrole-sulfur cathode for lithium-sulfur batteries," *J. Power Sources* 196, pp. 6951-6955 (2011).

(Continued)

*Primary Examiner* — Anca Eoff
(74) *Attorney, Agent, or Firm* — Cooley LLP

(57) ABSTRACT

The present invention is directed to lithium-sulfur batteries exhibiting a high capacity, high cycle life with low production cost and improved safety.

17 Claims, 19 Drawing Sheets

(56) References Cited

OTHER PUBLICATIONS

Lin, Z. et al., "Lithium Polysulfidophosphates: A Family of Lithium-Conducting Sulfur-Rich Compounds for Lithium-Sulfur Batteries," *Angew. Chem.-Int Edit.* 52, pp. 7460-7463 (2013).
Manthiram, A. et al., "Challenges and Prospects of Lithium Sulfur Batteries," *Accounts Chem. Res.* 46, pp. 1125-1134 (2013).
Meyer, B. et al., "Elemental Sulfur," *Chem. Rev.* 76, pp. 367-388 (1976).
Mikhaylik, Y. V. et al., "Polysulfide Shuttle Study in the Li$\overline{O}$S Battery System," *J. Electrochem. Soc.* 151, pp. A1969-A1976 (2004).
Peled, E. et al., "Lithium-Sulfur Battery-Evaluation of Dioxolane-Based Electrolytes," *J. Electrochem. Soc.* 136, pp. 1621-1625 (1989).
Schuster, J. et al., "Spherical Ordered Mesoporous Carbon Nanoparticles with High Porosity for Lithium-Sulfur Batteries," *Angew. Chem.-Int.* Edit 51, pp. 3591-3595 (2012).
Seh, Z. W. et al., "Sulphur-TiO2 yolk-shell nanoarchitecture with internal void space for long-cycle lithium-sulphur batteries," *Nat. Commun.* 4, pp. 1-6 (2013).
Shin, J. H. et al., "N-Methyl-(n-butyl)pyrrolidinium bis(trifluoromethanesulfonyl)imide-LiTFSI-poly(ethylene glycol) dimethyl ether mixture as a Li/S cell electrolyte," *J. Power Sources* 177, pp. 537-545 (2008).
Song, H. K. et al., "Redox-Active Polypyrrole: Toward Polymer-Based Batteries," *Adv. Mater.* 18, pp. 1764-1768 (2006).
Song, M. K. et al., "A Long-Life, High-Rate Lithium/Sulfur Cell: A Multifaceted Approach to Enhancing Cell Performance," *Nano Lett.* 13, pp. 5891-5899 (2013).
Su, Y. S. et al., "A strategic approach to recharging lithium-sulphur batteries for long cycle life," *Nature Communications* 4, pp. 1-8 (2013).
Sun, Y. et al., "Direct atomic-scale confirmation of three-phase storage mechanism in Li4Ti5O12 anodes for room-temperature sodium-ion batteries," *Nature Communications* 4, pp. 1-10 (2013).
Suo, L. M. et al., "A new class of Solvent-in-Salt electrolyte for high-energy rechargeable metallic lithium batteries," *Nature Communications* 4, pp. 1-9 (2013).
Tarascon, J. M. et al., "Issues and challenges facing rechargeable lithium batteries," *Nature* 414, pp. 359-367 (2001).
Van Noorden, R., "Sulphur back in vogue for batteries. Lithium-sulphur batteries benefit from new materials," *Nature* 498, pp. 416-417 (2013).
Wang, H. L. et al., "Graphene-Wrapped Sulfur Particles as a Rechargeable Lithium-Sulfur Battery Cathode Material with High Capacity and Cycling Stability," *Nano Lett.* 11, pp. 2644-2647 (2011).
Wang, J. et al., "Sulfur-mesoporous carbon composites in conjunction with a novel ionic liquid electrolyte for lithium rechargeable batteries," *Carbon* 46, pp. 229-235 (2008).
Wang, J. L. et al., "A novel conductive polymer-sulfur composite cathode material for rechargeable lithium batteries," *Adv. Mater.* 14, pp. 963-965 (2002).
Weng, W. et al., "Ultrasound Assisted Design of Sulfur/Carbon Cathodes with Partially Fluorinated Ether Electrolytes for Highly Efficient Li/S Batteries," *Adv. Mater.* 25, pp. 1608-1615 (2013).
Xin, S. et al., "Smaller Sulfur Molecules Promise Better Lithium-Sulfur Batteries," *J. Am. Chem. Soc.* 134, pp. 18510-18513 (2012).
Yamin, H. et al., "Lithium Sulfur Battery—Oxidization Reduction-Mechanisms of Polysulfides in Thf Solutions," *J. Electrochem. Soc.* 135, pp. 1045-1048 (1988).
Yang, Y. et al., "Improving the Performance of Lithium-Sulfur Batteries by Conductive Polymer Coating," *ACS Nano*, vol. 5, No. 11, 7 pp. (2011).
Yang, Y. et al., "Nanostructured sulfur cathodes," *Chem. Soc. Rev.*, vol. 52, No. 7, 15 pp. (2013).
Yao, Y. et al., "Improving the cycling stability of silicon nanowire anodes with conducting polymer coatings," *Energ. Environ. Sci.* 5, pp. 7927-7930 (2012).
Yin, Y. X. et al., "Lithium-Sulfur Batteries: Electrochemistry, Materials, and Prospects," *Angew. Chem.-Int. Edit.* 52, pp. 13186-13200 (2013).
Yuan, L. X. et al., "Improved dischargeability and reversibility of sulfur cathode in a novel ionic liquid electrolyte," *Electrochem. Commun.* 8, pp. 610-614 (2006).
Zhang, C. F. et al., "Confining Sulfur in Double-Shelled Hollow Carbon Spheres for Lithium-Sulfur Batteries," *Angew. Chem.-Int. Edit.* 51, pp. 9592-9595 (2012).
Zheng, G. Y. et al., "Amphiphilic Surface Modification of Hollow Carbon Nanofibers for Improved Cycle Life of Lithium Sulfur Batteries," *Nano. Lett.* 13, pp. 1265-1270 (2013).
Zheng, G. Y. et al., "Hollow Carbon Nanofiber-Encapsulated Sulfur Cathodes for High Specific Capacity Rechargeable Lithium Batteries," *Nano. Lett.* 11, pp. 4462-4467 (2011).

\* cited by examiner

SULFUR NANOSPONGE CATHODE FOR LITHIUM—SULFUR BATTERY AND METHODS OF MANUFACTURE THEREOF

CROSS-REFERENCE TO RELATED APPLICATION(S)

This application claims the benefit under 35 U.S.C. § 119(e) of U.S. Application No. 62/049,685, entitled "Scalable Synthesis of Sulfur Nanosponge Cathode for Lithium-Sulfur Battery with Greatly Improved Cyclability," and filed on Sep. 12, 2014, which application is hereby incorporated by reference herein.

GOVERNMENT SUPPORT

This invention was made with government support under Contract No. FA9550-08-1-0325 awarded by the U.S. Air Force and Contract No. DMR-1120901 awarded by the National Science Foundation. The government has certain rights in the invention.

BACKGROUND

The surging demand for rechargeable batteries in portable electronics and electric vehicles has stimulated extensive studies on various lithium-based electrode materials. Sulfur is a well-researched material that is nontoxic to the environment and earth-abundant. It can host two lithium ions ($Li^+$) non-topotactically, and exhibits a high theoretical capacity of 1675 mAh/g, almost 10 times that of commercially popular transition metal based intercalating cathode materials, such as $LiCoO_2$. In terms of gravimetric energy density, at 2.1 V versus $Li/Li^+$, lithium-sulfur (Li—S) batteries possess about 5 times the energy density compared to those based on $LiCoO_2$.

However, sulfur and its insoluble by-product compounds, such as $Li_2S_2$ and $Li_2S$, are poor electronic and ionic conductors (electronic insulators), which significantly reduces the effectiveness of Li—S batteries. Furthermore, these deficiencies necessitate positioning sulfur-based electrodes in constant and intimate contact with liquid electrolyte to enhance effective $Li^+$ conductivity, which otherwise leads to a rapid degradation of capacity and cycle life. In addition, the capacity of conventional Li—S batteries rapidly decay with the number of charge/discharge cycles due to rapid dissolution of soluble lithium polysulfides $Li_2S_X$ ($4 \leq X \leq 8$) into interfacial bulk liquid electrolyte, and/or via volume expansion-induced mechanical failures within the electrode structures that couple with and led to degrading electronic conductivity across the electrode. To retard the loss of S into the electrolyte solution, many strategies have been proposed and undertaken, such as modifying the electrolyte to be a poorer solvent for sulfur species, and engineering a better electrode and operating voltage of the electrochemical system, as described, for example, in the articles by Z. Lin, Z. C. Liu, W. J. Fu, N. J. Dudney and C. D. Liang, in Angewandte Chemie International Edition, 2013, 52, 7460-7463; by E. Peled, Y. Sternberg, A. Gorenshtein and Y. Lavi, in the Journal of the Electrochemical Society, 1989, 136, 1621-1625; by S. E. Cheon, K. S. Ko, J. H. Cho, S. W. Kim, E. Y. Chin and H. T. Kim, in the Journal of the Electrochemical Society, 2003, 150, A800-A805; by L. X. Yuan, J. K. Feng, X. P. Ai, Y. L. Cao, S. L. Chen and H. X. Yang, in Electrochemistry Communications, 2006, 8, 610-614; by J. H. Shin and E. J. Cairns, in the Journal of Power Sources, 2008, 177, 537-545; by Z. W. Seh, W. Li, J. J. Cha, G. Zheng, Y. Yang, M. T. McDowell, P.-C. Hsu and Y. Cui, in Nature Communications, 2013, 4, 6; by J. Wang, S. Y. Chew, Z. W. Zhao, S. Ashraf, D. Wexler, J. Chen, S. H. Ng, S. L. Chou and H. K. Liu, in Carbon, 2008, 46, 229-235; and by Y. S. Su, Y. Z. Fu, T. Cochell and A. Manthiram, in Nature Communications, 2013, 4, 2985. 'Solvent-in-Salt' electrolytes with ultrahigh salt concentration can also be used to achieve a high-energy rechargeable battery, for example as described in the articles by L. M. Suo, Y. S. Hu, H. Li, M. Armand and L. Q. Chen, in Nature Communications, 2013, 4; and by Y. Sun, L. Zhao, H. L. Pan, X. Lu, L. Gu, Y. S. Hu, H. Li, M. Armand, Y. Ikuhara, L. Q. Chen and X. J. Huang, in Nature Communications, 2013, 4. Strategies for inhibiting undesirable polysulfide dissolution reactions via modifying the charging condition were developed to obtain improved cycle life (>500 cycles), and additives like graphene, mesoporous carbon, and conductive polymers were exploited to facilitate efficient electron conduction, as described in the articles by H. L. Wang, Y. Yang, Y. Y. Liang, J. T. Robinson, Y. G. Li, A. Jackson, Y. Cui and H. J. Dai, in Nano Letters, 2011, 11, 2644-2647; by M. K. Song, Y. G. Zhang and E. J. Cairns, in Nano Letters, 2013, 13, 5891-5899; by N. Jayaprakash, J. Shen, S. S. Moganty, A. Corona and L. A. Archer, in Angewandte Chemie International Edition, 2011, 50, 5904-5908; by Y. Z. Fu and A. Manthiram, in the Royal Society of Chemistry Advances, 2012, 2, 5927-5929; by X. Liang, Y. Liu, Z. Y. Wen, L. Z. Huang, X. Y. Wang and H. Zhang, in the Journal of Power Sources, 2011, 196, 6951-6955; by H. K. Song and G. T. R. Palmore, in Advanced Materials, 2006, 18, 1764; by J. L. Wang, J. Yang, J. Y. Xie and N. X. Xu, in Advanced Materials, 2002, 14, 963; and by Y. Yao, N. Liu, M. T. McDowell, M. Pasta and Y. Cui, in Energy & Environmental Science, 2012, 5, 7927. By encapsulating sulfur in $TiO_2$ nanoshells with pre-existing void, the ~80% volume expansion of sulfur in lithiation can be accommodated and this yolk-shell structure can also restrict the intermediate polysulfides to reside within the structure, so the battery could run over 1000 cycles with good capacity retention, as described in Z. W. Seh, W. Li, J. J. Cha, G. Zheng, Y. Yang, M. T. McDowell, P.-C. Hsu and Y. Cui, in Nature Communications, 2013, 4, 6. However, although recent technological progress has been made in Li—S battery performance according to G. Y. Zheng, Y. Yang, J. J. Cha, S. S. Hong and Y. Cui, in Nano Letters, 2011, 11, 4462-4467, manufacturing such improved Li—S battery system at mass-production levels, employing a scalable and cost-effective synthesis is still yet to be demonstrated, until the present invention.

SUMMARY

In some embodiments described herein, a method of manufacturing is disclosed comprising functionalizing the surface of conductive carbon black particles, thereby forming hydroxyl and/or carboxyl groups on the surface of the conductive carbon black particles, dispersing a mixture comprising sulfur particles, and at least one surfactant in a matrix of the functionalized conductive carbon black particles, and heating the dispersed sulfur particles and functionalized conductive carbon black particles for a time and to a temperature above the melting point of sulfur, whereby the sulfur forms a coating over the functionalized conductive carbon black particles to form a nanostructured sponge having a sulfur-covering-carbon structure. In another embodiment, the method of functionalizing comprises contacting the conductive carbon black particles with acid. In another embodiment, the sulfur particles are formed in-situ in the functionalized conductive carbon black by reducing a water-soluble sulfur-containing compound. In another embodiment, heating is at a temperature ranging from about 150 to about 200° C. In another embodiment, the sulfur coating is no thicker than 1 micron. In another embodiment, the method of heating is carried out for a time ranging from about 2 to about 50 hours. In another embodiment, the conductive carbon black particles have a BET surface area ranging from about 40 m$^2$/g to about 80 m$^2$/g. In another embodiment, the method of dispersing comprises agitating in an aqueous solution, conductive carbon black particles, an acid, a surfactant and thiosulfate, whereby the thiosulfate forms sulfur particles and the conductive carbon black particles are surface functionalized in situ. In other embodiments, the method further comprises isolating and drying the mixture of functionalized conductive carbon black particles and sulfur particles. In another embodiment, a cathode comprises a nanostructured sponge having a sulfur-covering-carbon structure prepared by the methods disclosed herein. In some embodiments, a lithium battery comprises an anode, the cathode as prepared by the methods described herein, and an electrolyte. In another embodiment, the lithium battery contains an anode selected from the group consisting of carbon (graphite, graphene, hard carbon, mesoporous carbon, etc. and any combination thereof), silicon, silicon/carbon composite, lithium titanate (LTO, $Li_4Ti_5O_{12}$, etc), and tin cobalt alloy. In another embodiment, the lithium battery contains an electrolyte selected from the group consisting of electrolyte containing lithium salts (e.g., $LiPF_6$, $LiBF_4$ or $LiClO_4$) and combinations of linear and cyclic carbonates (e.g., ethylene carbonate, dimethyl carbonate or poly(oxyethylene)).

In some other embodiments, a nanostructured sponge cathode is disclosed which comprises a conductive carbon black matrix and sulfur, wherein the sulfur is disposed over the conductive carbon black particles to provide a sulfur-over-carbon structure. In another embodiment, the nanostructured sponge cathode contains the particle size of said conductive carbon black particles ranges from 80 nm to 800 nm. In another embodiment, the sulfur of the nanostructured sponge cathode is substantially amorphous. In another embodiment, the nanostructured sponge cathode comprises a conductive polymer. In another embodiment, the nanostructured sponge cathode includes the conductive polymer comprising polypyrrole. In another embodiment, the nanostructured sponge cathode contains sulfur whose amount ranges from about 50 wt. % to about 70 wt. %. In another embodiment, the nanostructured sponge cathode comprises sulfur-carbon clusters smaller than about 10 μm.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements). All documents disclosed herein are incorporated by reference in the entirety for all purposes.

DETAILED DESCRIPTION

The description provided herein describes a method of production with novel processing steps described in detail, as well as novel sulfur containing cathodes, and Li batteries comprising such cathodes. The various embodiments provide a cheap and simple approach to manufacture sulfur-based electrodes with carbon additives for high-capacity lithium ion batteries with long cycle life. All documents disclosed herein are incorporated by reference in their entirety for all purposes.

In various embodiments, the present invention comprises liquid-based, low-cost and reliable synthetic methods for lithium-sulfur composite cathodes containing an open network of conductive carbon black nanoparticles (Cnet), infused with sulfur (Snet) to form sponge-like networks (Cnet+Snet). Without limitation to a specific mechanism, it is believed that Snet has open access to the outside, allowing liquid electrolyte to infiltrate and impart Snet $Li^+$ conductivity. During lithiation, Cnet accommodates the volume expansion of Snet without substantially losing electrical contact due to the interconnected nature of the network. During delithiation, the carbon nanoparticles flocculate on the outer surface of the composite due to depletion of sulfur by polysulfide dissolution, to form a passivation layer that still allows $Li^+$ exchange, but preferentially slows down the loss of sulfur into the bulk electrolyte liquid. By using an extra carbon deposition layer to provide a carbonaceous passivation layer, improved performance is provided, i.e., about 400 mAh/g of discharge specific capacity after 250 cycles under a high C-rate 2.0. A 763 mAh/g discharge specific capacity for this sulfur nanosponge cathode (abbreviated as "SULFUN") was obtained after 100 cycles under a C-rate of 0.2. 520 mAh/g and 290 mAh/g discharge capacities were attained after 300 and 500 cycles, respectively.

As described in some embodiments, commercially available Conductive Carbon Blacks (such as Super P®) are used in a facile wet-chemistry method to synthesize a sulfur-carbon nanosponge. One of the purposes is to enhance cyclability by using the evolving microstructure of sulfur-carbon nanosponge during lithiation and delithiation process to help delay the loss of active sulfur ions. This approach utilizes cheap carbon black as the base matrix to construct a sulfur-covering-carbon sponge, instead of utilizing the traditional carbon-wrapping-sulfur geometry. Even though sulfur is not coated over the carbon in the beginning prior to first lithiation, the nanosponge structure of the composite synthesized using the described method can reduce sulfur loss during cycling.

Figure 1:
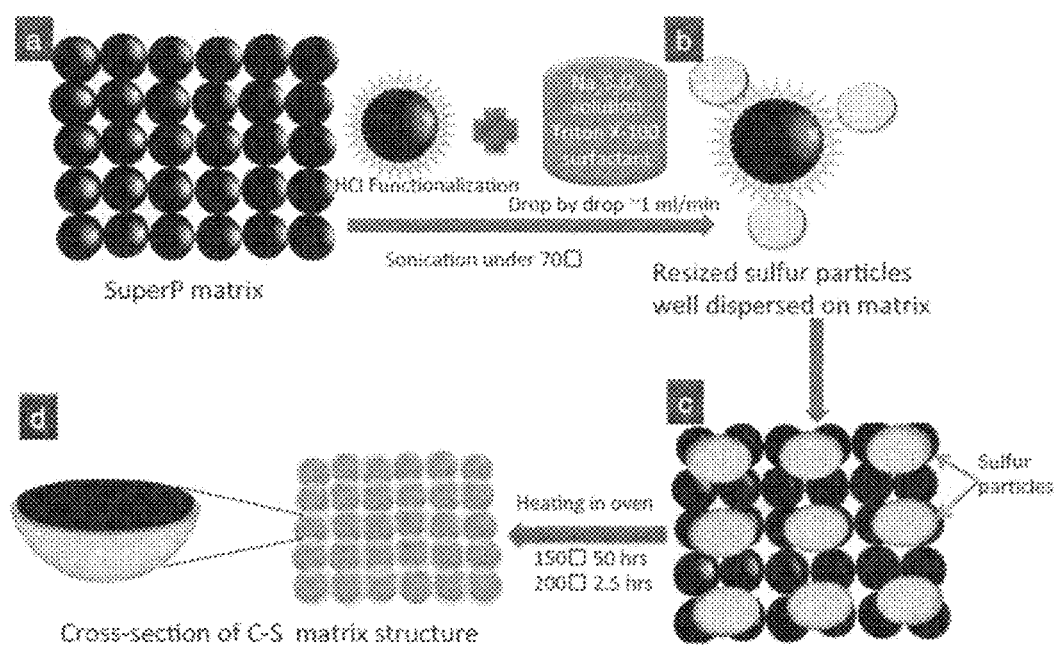
FIG. 1 is a schematic of manufacturing process flow for in-situ synthesis of sulfur nanosponge (SULFUN) cathode matrix.
Figure 6:
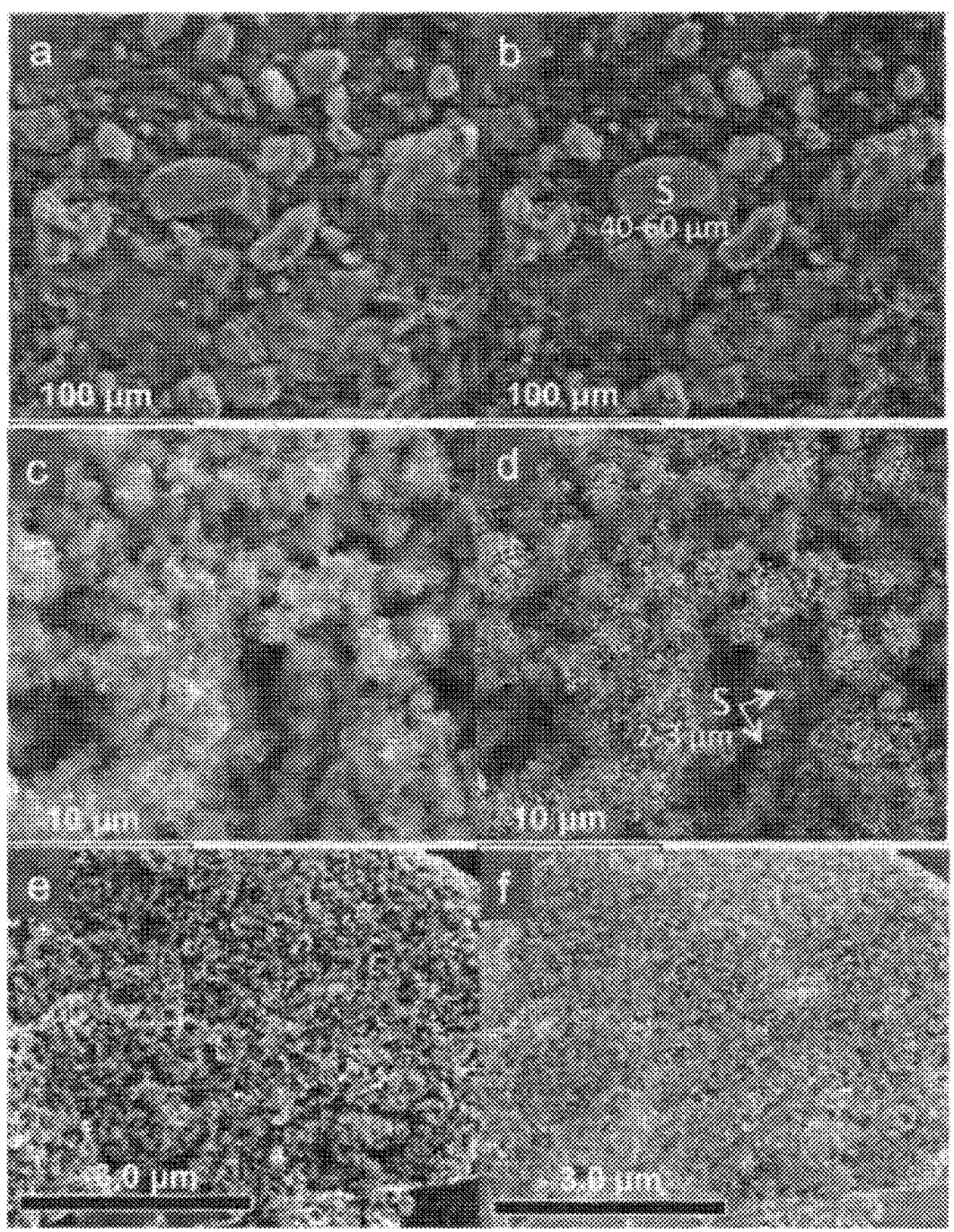
FIG. 6 are SEM images and the corresponding Energy-dispersive X-ray spectroscopy (EDS) mappings. SEM morphologies of the milled S/C mixture (a), before (c) and after (e) annealed at 200° C. with 2.5 hours. (b), (d), and (f) are sulfur and carbon mappings of the areas shown in (a), (c), and (e), respectively.

To construct a well-blended matrix, a three-step process was developed: 1) Conductive Carbon Blacks such as Super P® were first functionalized by an acid such as hydrochloric acid, as shown in FIG. 1a. The carbon nanoparticles of ~70 nm in diameter adhere to each other, forming a percolating electrical network (Cnet, FIG. 1a); 2) The in-situ formed small sulfur particles surrounded with surfactants were dispersed in the solution with Super P using a redox reaction (e.g., disproportionation of thiosulfate under acidic conditions) under agitation, such as ultrasonic or mechanical agitation (FIG. 1b-c); The ultrasonic agitation breaks apart carbon particle agglomerations, enabling in-situ formation of small sulfur-carbon clusters (2-4 μm), as shown in FIG. 6c-d. For comparison, a well-mixed S/C composite prepared via mortar milling without sonication displays separate, flat sulfur flakes with much larger sizes of 40-60 μm (FIG. 6b). 3) With heating at an annealing temperature of 150° C. or 200° C., the distributed sulfur was melted and deeply infiltrated into the framework and spread across the carbon surface, to form a sulfur-covering-carbon configuration, which is the other percolating network (Snet) (FIGS. 1d and 6e-f). Cnet and Snet interpenetrate each other and are in intimate contact, forming a nanostructured sponge which we call SULFUN. During lithiation/delithiation, the sponge-like structure of Cnet has the ability to "breath" to accommodate ~80% volume expansion of Snet without losing electrical contact, according to the porosity calculation. SULFUN has a different initial topology (Cnet+Snet, with both initially open to the outside) from the known carbon-wrapping-sulfur approach where the intent is to completely encapsulate and isolate the sulfur.

In-situ Synthesis of Sulfur-Carbon Sponge Matrix

Details of the in-situ synthesis of Sulfur-Carbon sponge matrix are as follows. In one embodiment 70 wt % (according to the approximate loading in the final S—C matrix) Conductive Carbon Blacks (Super C65, Timical) was first treated in a solution mixed with 20 ml hydrochloric acid (1 N volumetric solution, Avantor Performance Materials, Inc.) under stirring on a hot plate (Super-Nuova, Thermo Scientific) for 2 hours at 70° C. Then 100 ml deionized water was added. Meanwhile, sodium thiosulfate (anhydrous, 99%, Alfa Aesar) was dissolved in 150 ml deionized water with surfactant Triton X-100 (1% in deionized water, Alfa Aesar) [17]. Then, the sodium thiosulfate solution was added into the Conductive Carbon Blacks solution with a dropping speed of ~1 mL/min under an ultrasonic agitation (Symphony, VWR Ultrasonic Cleaner) at a constant temperature of 70° C. The reacted sample was centrifuged (IEC HN-SII Centrifuge, Damon/IEC Division) and dried at 60° C. in an oven (Symphony, VWR). Finally, the dried mixture was annealed at temperatures of 150° C. for 50 hours ("low-temperature") or 200° C. for 2.5 hours ("high-temperature") in air, respectively. The collected samples were stored for coin cell assembly and battery performance test.

It will be recognized by the skilled artisan that a variety of commercially available conductive carbon blacks, in suitable amounts, can be employed, such as Akzo Nobel's Ketjenblack family of carbon blacks or Cabot Corporation's LITX™ family of carbon blacks. In addition, other mineral acids such as sulfuric, nitric, etc. could be employed.

For comparison, 80 wt % commercial sulfur (Sulfur powder, 99.5%, Alfa Aesar), 10 wt % Super P and 10 wt % binder were uniformly milled for 30 minutes in a mortar. After the milling, the mixture was applied to make a slurry on Al foil and then the final coin cell was assembled using a same protocol.

Characterizations of Morphology, Chemical Composition, and Structure

SEM: The surface morphologies were evaluated using a FEI/Philips XL30 FEG Environmental Scanning Electron Microscope (ESEM) and JEOL 6320 Field-Emission High-Resolution SEM at 5-10 kV incident energy. The carbon-sulfur elemental mapping was obtained through energy-dispersive spectroscopy microanalysis using an INCA EDS detector at 20 kV acceleration voltage.

TEM: The in-situ formed sulfur and S—C sponge treated at different annealing temperatures were characterized by transmission electron microscopy (TEM) using a JEOL JEM-2010F at an accelerating voltage of 200 kV. The TEM sample was dispersed on a lacy carbon film supported on a copper grid to acquire the images. In order to reduce electron-beam damage, a low magnification with weak beam intensity was applied when the images were captured.

TGA: Thermal gravimetric analysis (TGA, SEIKO SSC/5200 TG/DTA220 thermal analysis station) and differential scanning calorimetry curves were recorded in argon as working gas. The temperature program was set to be isothermal at 50° C. for 10 min and heated up to 650° C. with a heating rate of 10° C. min$^{-1}$.

Battery performance of SULFUN was measured via coin cells, which were assembled inside a glove box. SULFUN was used as the cathode while a Li foil served as the anode, in an electrolyte of 1.0 M lithium bis-trifluoromethanesulfonylimide (LiTFSI) in 1,3-dioxolane (DOL) and 1,2-dimethoxyethane (DME) (DOL:DME=1:1 in volume). Because the Snet is initially open to the outside, the LiTFSI+DOL+DME liquid electrolyte wets and infiltrates Snet in the initial lithiation, dissolving some sulfur and forming some soluble lithium polysulfides. The "wet" Snet then has some significant Li$^+$ conductivity that percolates within Cnet.

Figure 2:
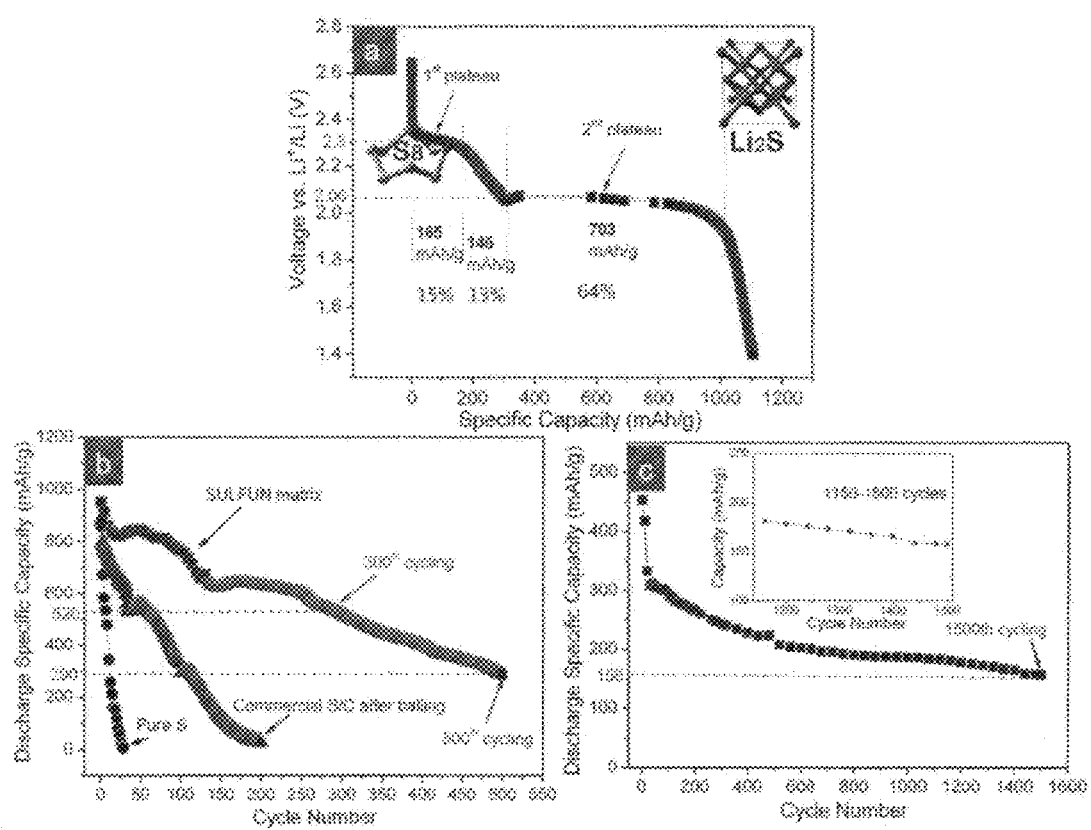
FIG. 2 shows discharge voltage profiles of SULFUN (a) treated at 200° C. with 2.5 hours with a charge rate of 0.2 C; cycling performance of commercial pure sulfur, mortar milled S/C mixture, and SULFUN treated at 200° C. for 2.5 hours (b); and at 150° C. for 50 hours (c) at a charge rate of 0.2 C.

FIG. 2a depicts an initial discharge specific capacity of ~1100 mAh/g at a 0.2 C rate (C rate is calculated based on the theoretical capacity 1675 mAh/g of sulfur). Two main plateaus appear in the discharging window of 2.5 to 1.5 V (FIG. 2a). The first plateau (I) centering at ~2.3 V corresponds to the sequential reduction of sulfur (S$_8$) to high-order polysulfides Li$_2$S$_X$ (4≤X≤8). During the complex reactions, a series of soluble lithium polysulfides are generated. As illustrated in the discharge curve, this plateau is quite short, which only presents a minor capacity of ~165 mAh/g (about 15% of the overall 1100 mAh/g). Then there is a short transition (II), which contributes a small portion ~146 mAh/g (~13%) as well. A big plateau (III) is located at ~2.06 V, which is attributed to the continuous conversion of Li$_2$S$_X$ (4≤X≤8) to low order Li$_2$S$_2$ and Li$_2$S. In this last step, sulfur is reduced to the final state of insoluble Li$_2$S, as described by C. Barchasz, F. Molton, C. Duboc, J. C. Lepretre, S. Patoux and F. Alloin in *Analytical Chemistry*, 2012, 84, 3973-3980. The dominance of this reaction is evidenced by the long plateau which constitutes a major portion (~64%) of the total capacity. Although the insoluble sulfides can increase the volume and the electrical resistance, plenty of interlinked carbon nanoparticles maintain good electron conduction paths to ensure uninterrupted lithiation/delithiation. In other words, Cnet is mechanically robust enough and has nano-pore-like configuration (Specific surface area: >70 m$^2$/g) with flexibility that it can accommodate the ~80% volume change of Snet by unfolding, while maintaining good electrical conductivity and contact with Snet. Otherwise the cycling performance would degrade very rapidly, which was indeed the case historically.

Figure 3:
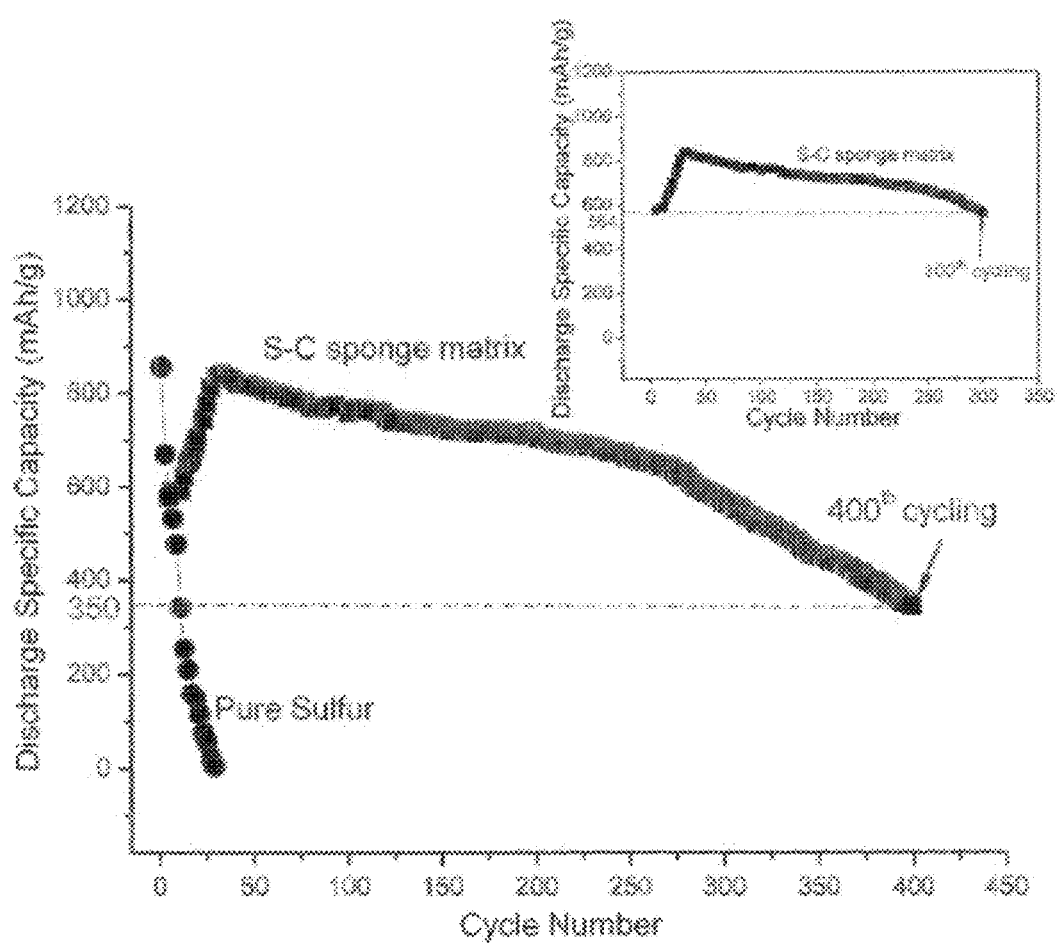
FIG. 3 Comparable cycling performance of the pure sulfur and SULFUN matrix treated at 200° C. for 2.5 hours at a rate of 0.2 C. The inset is the enlarged cycling profile. This sample was synthesized using the complete method as in FIG. 2b.

Shown in FIG. 2b is the cycling capability of SULFUN cathode annealed at 200° C. With a charging/discharging rate of 0.2 C, a specific discharge capacity as high as ~763 mAh/g was retained after running 100 cycles. After 300 cycles, a ~520 mAh/g capacity was still retained, which implies less than 0.2% decay for each cycle (FIG. 2b). The capacity was maintained at a high level of ~290 mAh/g even at the 500$^{th}$ cycle. A long-cyclability coin cell made of the same matrix is shown in FIG. 3, demonstrating reproducibility. Because of the multi-step procedure during material synthesis and battery assembly, a minor variation in performance inevitably exists. The 150° C. annealed sample displays a better cycling behavior, as evidenced in FIG. 2c. After being subjected to extremely long cycling such as 1500 cycles, the discharge capacity is still as high as 158 mAh/g (FIG. 2c). It is noted that after running 1100 cycles, the capacity shows almost no significant drop (FIG. 2c inset). A comparison of battery performance using the disclosed methods and compositions with the literature is shown in Table 1.

TABLE 1

The battery performance of different Li—S battery systems.

| Approach | 1$^{st}$ Discharge Capacity (mAh/g) | Reversible Discharge Capacity (mAh/g) | Charge Rate (mA/g) | Total Cycle Number | Degradation Rate Per Cycle | Sulfur Loading | Ref. |
|---|---|---|---|---|---|---|---|
| SULFUN | 1000-1400 | 520 (300$^{th}$, 0.2 C) 290 (500$^{th}$, 0.2 C) 400 (250$^{th}$, 2 C) | 335 (0.2 C) 3350 (2 C) | >500 | 0.24% (0.2 C) 0.36% (2 C) | 65 wt % (2 mg/cm$^2$) | Current work |
| S—TiO$_2$ yolk-shell nanocomposite | 1,030 | 690 | 836 (C/2) | 1,000 | 0.033% | 53 wt %, 0.4-0.6 mg/cm$^2$ | 1 |
| Solvent-in-salt electrolyte | 1,041 | 770 | 335 (C/5) | 100 | 0.26% | 48 wt % | 2 |
| Ordered mesoporous C—S | 1,070 | 700 | 1675 (1 C) | 100 | 0.35% | 57 wt % | 3 |
| Double-shelled C—S composite | 1,020 | 690 | 167 (C/10) | 100 | 0.32% | 45 wt % | 4 |

TABLE 1-continued

The battery performance of different Li—S battery systems.

| Approach | 1st Discharge Capacity (mAh/g) | Reversible Discharge Capacity (mAh/g) | Charge Rate (mA/g) | Total Cycle Number | Degradation Rate Per Cycle | Sulfur Loading | Ref. |
|---|---|---|---|---|---|---|---|
| Porous hollow C—S composite | 1,071 | 974 | 836 (C/2) | 100 | 0.09% | 65 wt % | 5 |
| Hollow CNF-encapsulated S | ~1,400 | 730 | 836 (C/2) | 150 | 0.48% | ~1.0 mg/cm$^2$ | 6 |
| Amphiphilic surface-modified hollow CNF-S | 828 | ~660 | 836 (C/2) | 300 | 0.07% | ~1.0 mg/cm$^2$ | 7 |
| Ultrasound-assisted S—C with fluorinated ether | 1,195 | 836 | 230 | 100 | 0.30% | 29 wt % | 8 |
| S molecules in a C/CNT matrix | 1,670 | 1,142 | 167.5 (C/10) | 200 | 0.16% | 32 wt % | 9 |
| Li—S with interlayers with modified recharge setting | 1,483 | 600 and 1000 | 335 (C/5) | >300 (600 mAh/g) >200 (1000 mAh/g) | 0.0011% (600 mAh/g) 0.0027% (1000 mAh/g) | 70 wt % | 10 |

1. Z. W. Seh, W. Li, J. J. Cha, G. Zheng, Y. Yang, M. T. McDowell, P.-C. Hsu and Y. Cui, in Nature Communications, 2013, 4, 6
2. L. M. Suo, Y. S. Hu, H. Li, M. Armand and L. Q. Chen, in Nature Communications, 2013, 4
3. J. Schuster, G. He, B. Mandlemeier, T. Yim, K. T. Lee, T. Bein and L. F. Nazar, Angew. Chem.-Int. Edit., 2012, 51, 3591-3595.
4. C. F. Zhang, H. B. Wu, C. Z. Yuan, Z. P. Guo and X. W. Lou, Angew. Chem.-Int. Edit., 2012, 51, 9592-9595.
5. N. Jayaprakash, J. Shen, S. S. Moganty, A. Corona and L. A. Archer, in Angewandte Chemie International Edition, 2011, 50, 5904-5908.
6. G. Y. Zheng, Y. Yang, J. J. Cha, S. S. Hong and Y. Cui, in Nano Letters, 2011, 11, 4462-4467.
7. G. Y. Zheng, Q. F. Zhang, J. J. Cha, Y. Yang, W. Y. Li, Z. W. She and Y. Cui, Nano Lett, 2013, 13, 1265-1270.
8. W. Weng, V. G. Pol, and K. Amine, Adv Mater, 2013, 25, 1608-1615.
9. A. Manthiram, Y. Z. Fu and Y. S. Su, Accounts Chem. Res., 2013, 46, 1125-1134
10. Y. S. Su, Y. Z. Fu, T. Cochell and A. Manthiram, in Nature Communications, 2013, 4, 2985.

Figure 4:
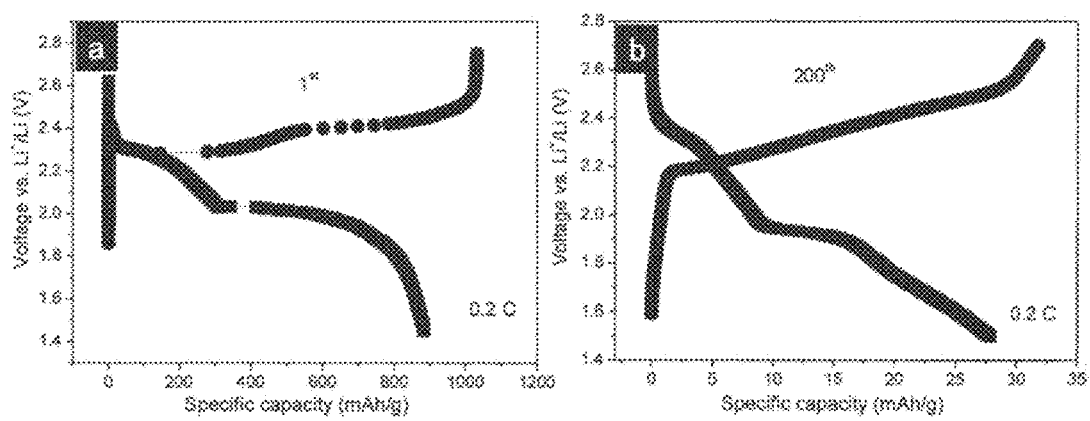
FIG. 4 Charge/discharge voltage profiles of the mortar milled S/C mixture coin cells after cycling at 0.2 C. The $1^{st}$ a) and the $200^{th}$ b) cycles.
Figure 5:
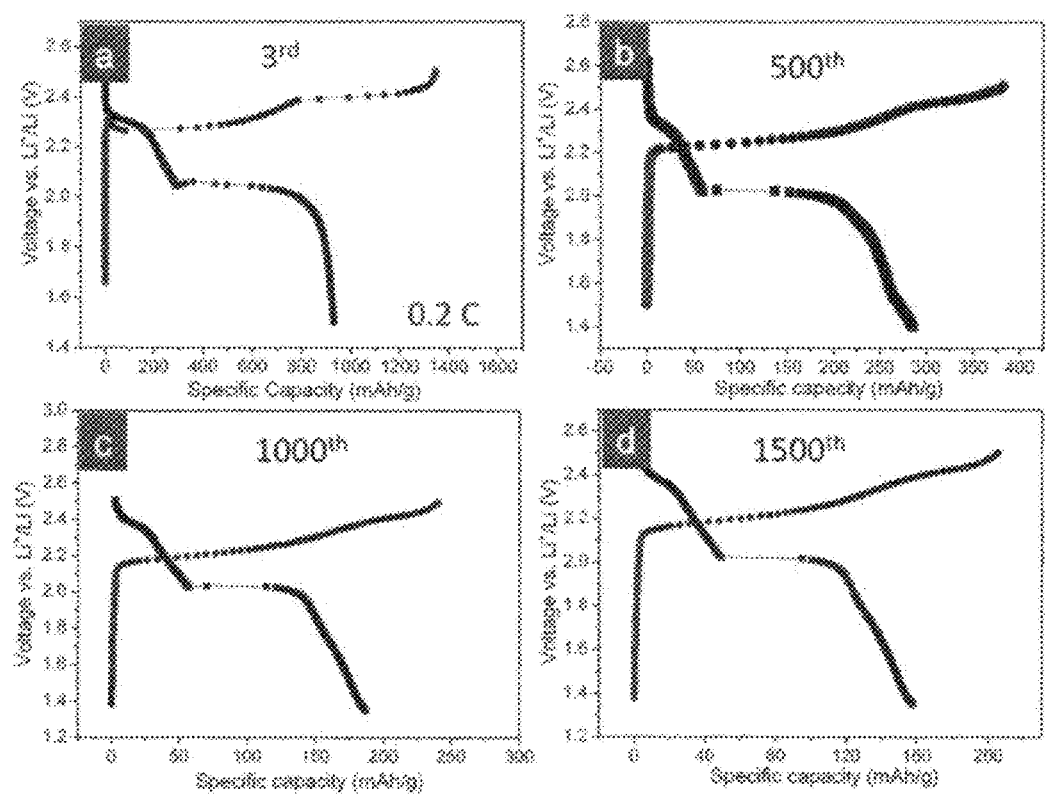
FIG. 5 Charge/discharge voltage profiles of the SULFUN coin cells after cycling at 0.2 C. Samples annealed at 200° C. a-b) and at 150° C. c-d).

For microstructural comparison, coin cells made of commercial pure sulfur and mortar-milled S/C mixture cathodes were also tested, as shown in FIGS. 2b and 3. For the pure sulfur, the capacity drastically decreased from ~856 mAh/g to less than 200 mAh/g after only 15 cycles. The battery almost died after 29 cycles. As for the mortar-milled S/C mixture, the capacity dropped to less than 300 mAh/g after 100 cycles and almost down to zero at the 200$^{th}$ cycle (FIG. 2b). The two plateaus from the charge/discharge voltage profile almost disappeared after 200 cycles (FIG. 4) while they were still observed apparently even after 1500 cycles in SULFUN (FIG. 5). It was further observed that in the coin cell assembly with the SULFUN cathode, adding a trace of conductive polymer polypyrrole (PPy) in the SULFUN/binder/Super P slurry acts as a network to restrain the dissolution of intermediate products. It will not impair Li$^+$/e$^-$ transport due to the relatively high electric conductivity (0.005 Scm$^{-1}$) of PPy, and appears to trap both polysulfides and possibly detached sulfur particles without raising resistance, which can further reduces the rate at which the capacity of the cell decreases.

Figure 17:
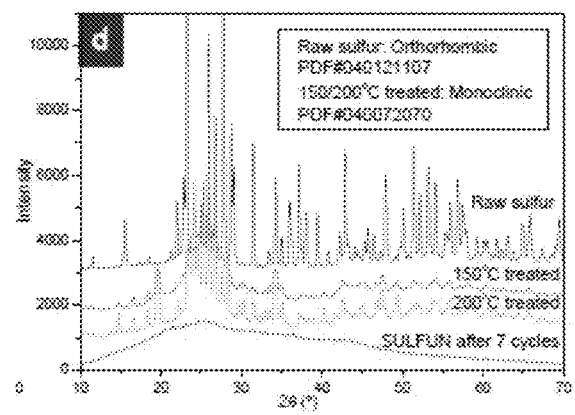
FIG. 17 shows XRD patterns of raw sulfur, annealed sulfur-carbon matrices, and the SULFUN matrix after 7 charge/discharge cycles ending in charging.

The atomic structure and evolution of sulfur inside SULFUN was investigated. As shown in FIG. 17, the X-ray diffraction pattern (XRD) of the as-received raw sulfur indicates an orthorhombic structure. After annealing, a monoclinic crystalline structure was stabilized. A totally amorphous structure of sulfur was found upon the completion of 7 cycles (ending in charging) of the SULFUN cathode.

Figure 7:
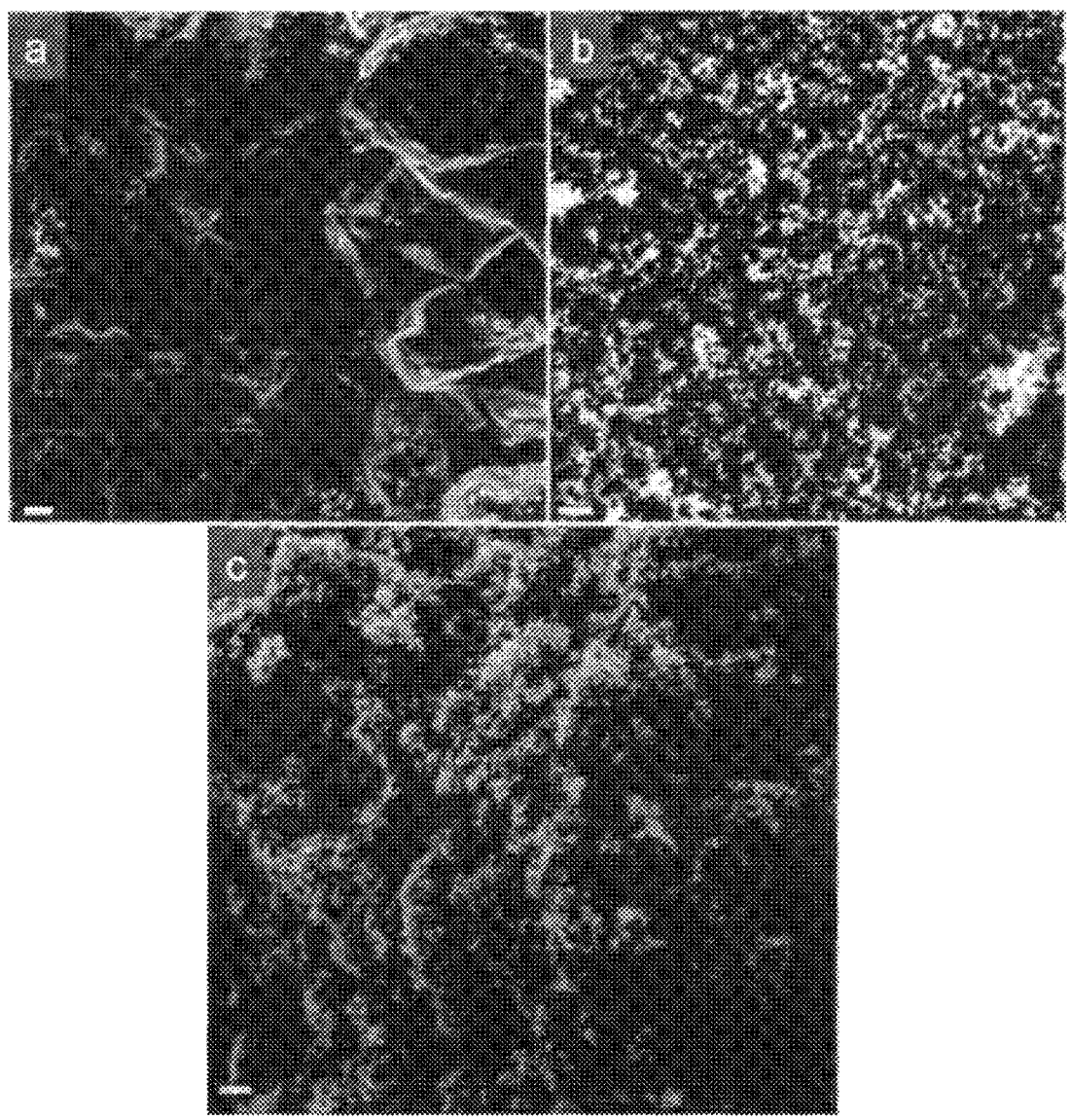
FIG. 7 SEM imaging of as-synthesized pure sulfur without carbon a), SULFUN matrix treated at 150° C. for 50 hours b), and 200° C. for 2.5 hours c). Scale bar is 1 μm.
Figure 8:
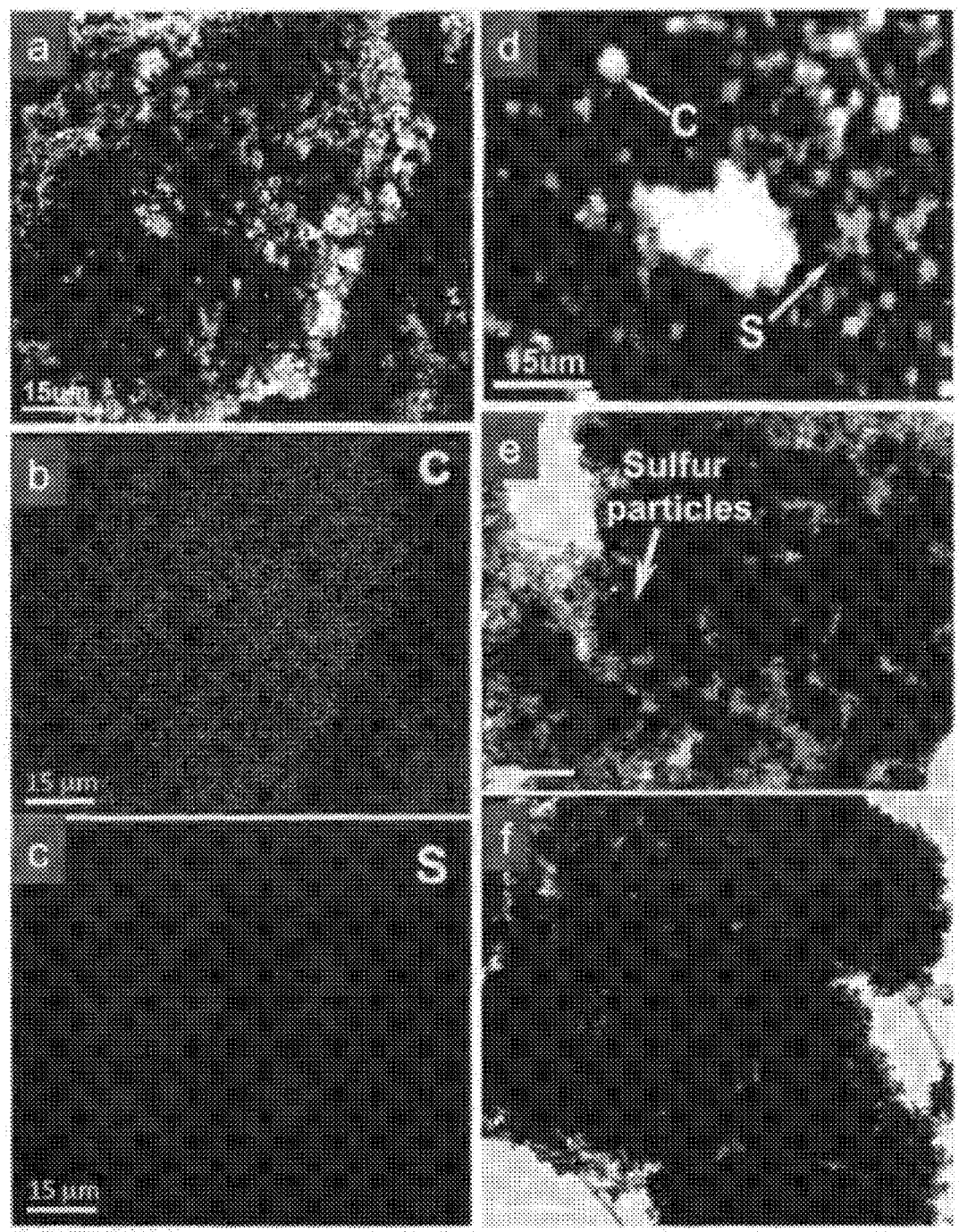
FIG. 8 EDS maps and electron microscopy images of the SULFUN matrix. a) SEM morphology of the matrix annealed at 150° C. with 50 hours. Carbon b) and sulfur c) mappings of the area shown in a). d) Sulfur and carbon mapping of as-received SULFUN matrix before heating. TEM imaging of the SULFUN before e) and after f) heating at 200° C. with 2.5 hours. Scale bar in e) and f): 5 μm.
Figure 9:
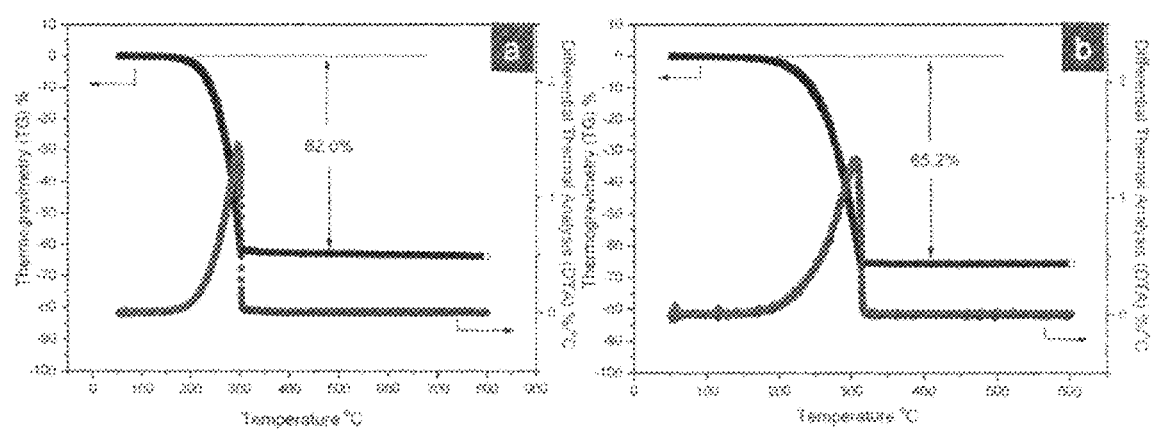
FIG. 9 TGA profiles and DTA curves recorded in argon with a heating rate of 10° C. min$^{-1}$, for SULFUN matrices treated at 150° C. with 50 hours a) and 200° C. with 2.5 hours b), respectively.

The morphology of sulfur was characterized by electron microscopy. As shown in FIG. 7a, the as-fabricated sulfur without carbon host has a particle size ranging 5-10 μm. The commercial sulfur after mortar milling has a particle size ranging 40-60 μm (FIG. 6a-b). However, during SULFUN fabrication step 2), the size of sulfur particles dispersed on the carbon matrix surface becomes smaller (FIGS. 6c-d and 8d-e/19d-e), corresponding to sulfur particle sizes of 2-4 μm, which is about 50% less than the particles size of freestanding sulfur in FIG. 7a and much smaller than the commercial pure (FIG. 10a) and mortar-milled (FIG. 6a-b) sulfur. The sulfur was dispersed rather uniformly on the carbon surface, as illustrated from the energy-dispersive X-ray spectroscopy (EDS) mapping in FIGS. 6d and 8d/19d. In contrast to the separate sulfur particles after milling (FIG. 6a-b), the ball-like S/C cluster with decreased sizes ensures a sufficient contact, leading to a high ion/electron conductivity (FIG. 6c-d). In order to further reduce the microstructural length scale and form a compact nanoscale S—C network, the sulfur was subsequently melted during SULFUN fabrication step 3 at 150° C. or 200° C. Under this temperature, like a water filtering sponge, the fluidic sulfur permeated inside the carbon sponge (FIG. 1d). As displayed in FIGS. 6e-f and FIGS. 7b-c, after heating the sulfur almost cannot be isolated from the Cnet any more. TEM images of the 200° C. treated sample also exhibits a uniform composition (FIGS. 8f and 19f). Elemental mapping of local areas clearly shows a proportional distribution of sulfur and carbon (FIGS. 3d-f and 7a-c/19a-c). These data imply that Snet has been interfused with the nanostructured Cnet, with improved adhesion between sulfur and carbon, providing a fast pathway for ion/electron transport. According to the estimated volume of the matrix, the gravimetric loading of sulfur is about 70 wt %. Quantitative thermal-gravimetric analysis (TGA) reveals the final loading of sulfur in SULFUN was 62 and 65 wt % after heat treatment at 150 and 200° C., respectively. (FIG. 9).

The initial size of sulfur particles plays a critical role on the imbibition process and the later cyclability of the resulting electrochemical cell. To obtain a homogenous cathode, well-dispersed sulfur particles with a small size are significant. In the present method, carbon black first underwent acid treatment in hydrochloric acid to create functional hydroxyl/carboxyl groups. In parallel, the added surfactant groups surrounded the fresh sulfur particles to prevent Ostwald ripening. The surfactant also helped to disperse the sulfur particles more efficiently in the matrix. Then, a very important step is the slow redox reaction, in which e.g. sodium thiosulfate solution was added into the functionalized carbon suspension slowly, drop by drop, with vigorous agitation. As a result, sulfur with a reduced particle size uniformly spread over a wide area of the carbon surface was provided, and which was subsequently melted and spread further by annealing at 150° C. for 50 hours or at 200° C. for 2.5 hours (FIG. 6c-d). In contrast, the particle size of commercial ground and pure sulfur possesses is 40-60 μm (FIGS. 6a-b and 10a-b).

Figure 10:
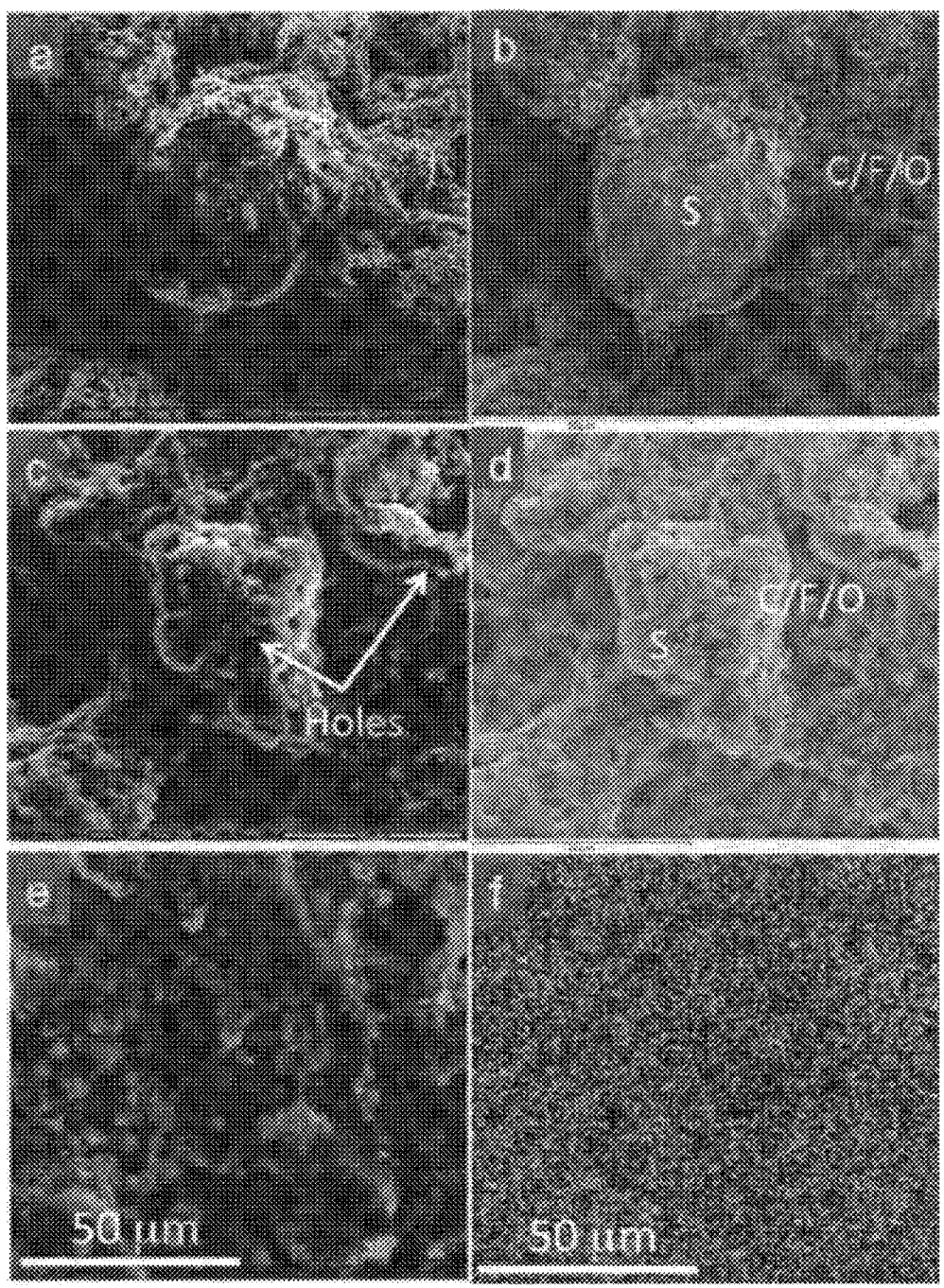
FIG. 10 shows morphological evolution of commercial sulfur particle and SULFUN during charge/discharge. SEM morphologies of the commercial sulfur mixture with Super P and binder before (a) and after two cycles (c). (b) and (d) are EDS Element maps of the areas shown in (a) and (c), respectively. (e) shows SEM morphology of the electrode made of SULFUN annealed at 200° C. for 2.5 hours after two cycles with corresponding sulfur elemental maps (f).
Figure 11:
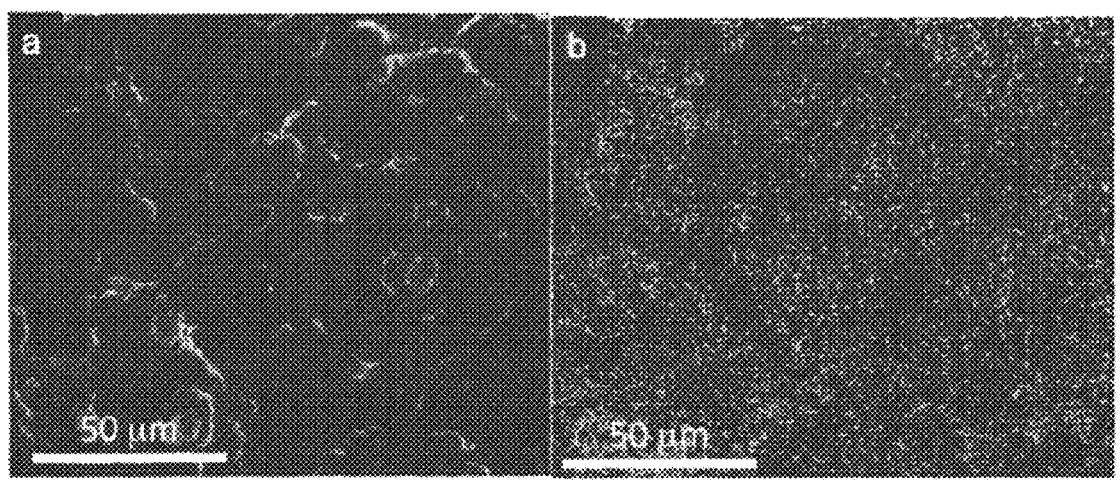
FIG. 11 SEM image and EDS maps of the commercial cathode electrode after running two cycles. a) SEM morphology of the electrode. b) The corresponding sulfur element map.
Figure 12:
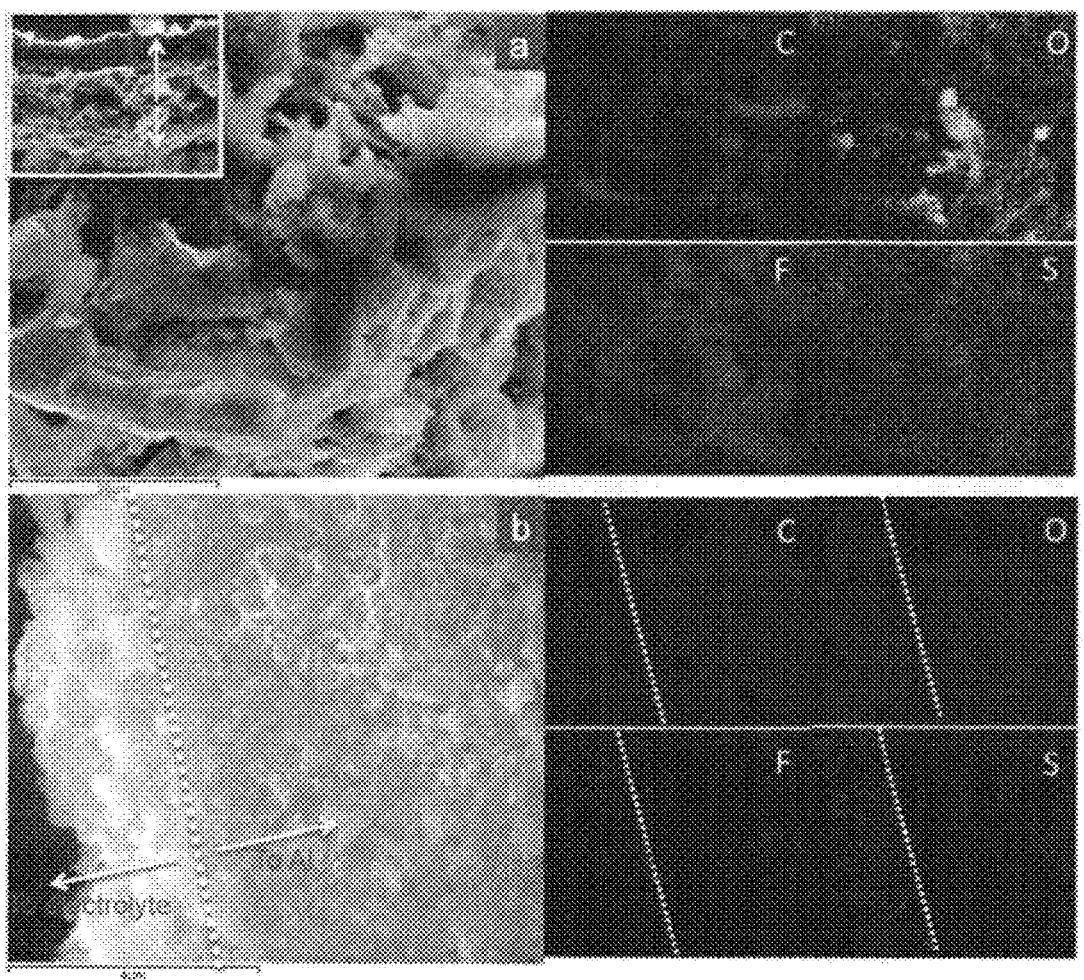
FIG. 12 shows cross-section images of the electrode after two charge/discharge cycles. SEM images and the corresponding EDS elemental maps of the cross-section of the electrode made of commercial sulfur (a) and SULFUN (b). The elemental map data indicate that the electrolyte was suppressed by the SULFUN surface instead of the commercial sulfur.
Figure 13:
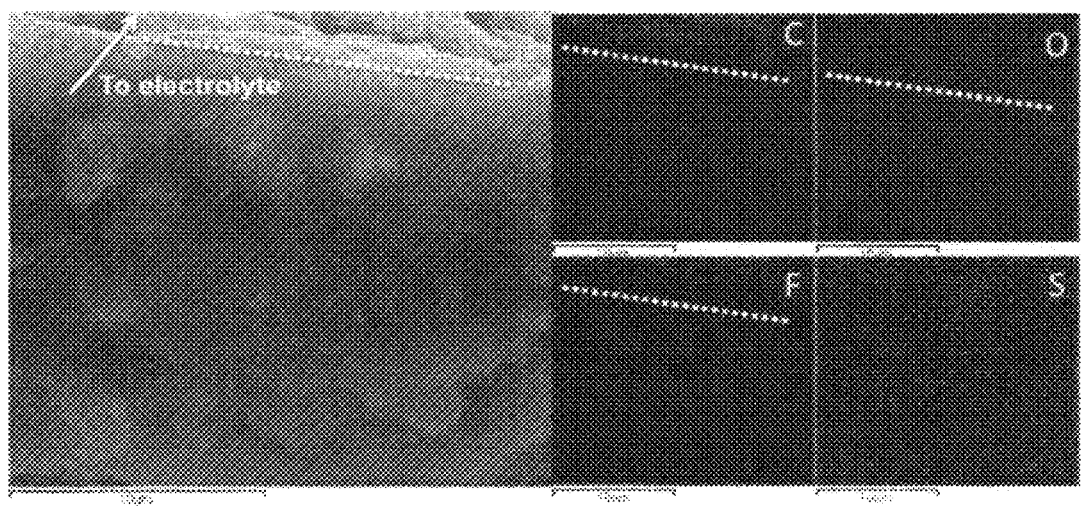
FIG. 13 SEM image and the corresponding EDS element map of the cross-section of the electrode made of SULFUN after charging/discharging two cycles (different sample with FIG. 5b). The dashed white shows the boundary between the newly formed carbon layer and the electrode film.
Figure 14:
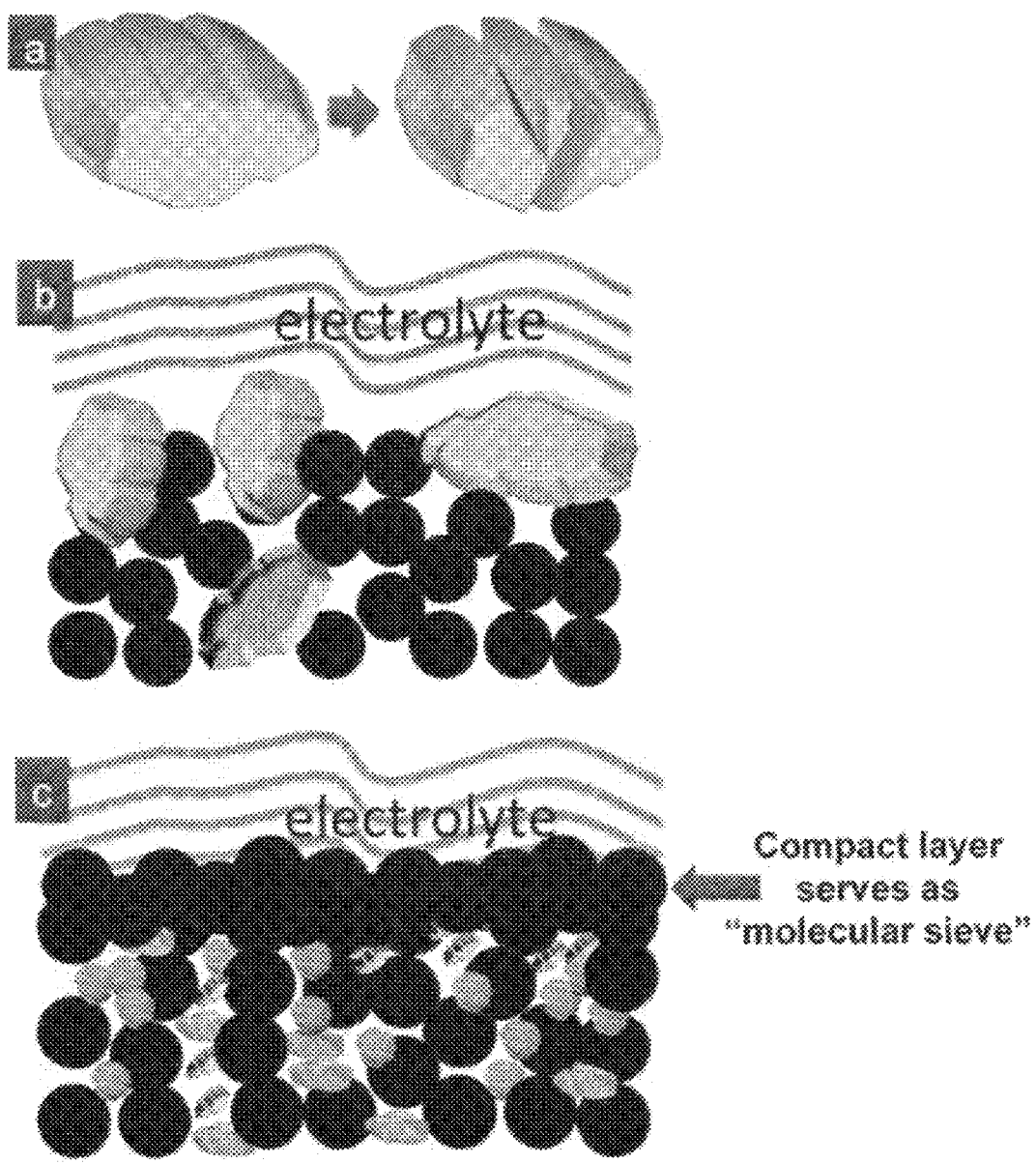
FIG. 14 shows a schematic illustration of reaction mechanism during charging and discharging. (a) illustrates that a sulfur particle generates holes and cracks due to the anisotropic reaction. Commercial sulfur particle shows a much larger $S_{contact}/V_s$ ratio (b) compared to the compact SUL- FUN matrix (c), which greatly delays the loss of sulfur during electrochemical reaction.
Figure 15:
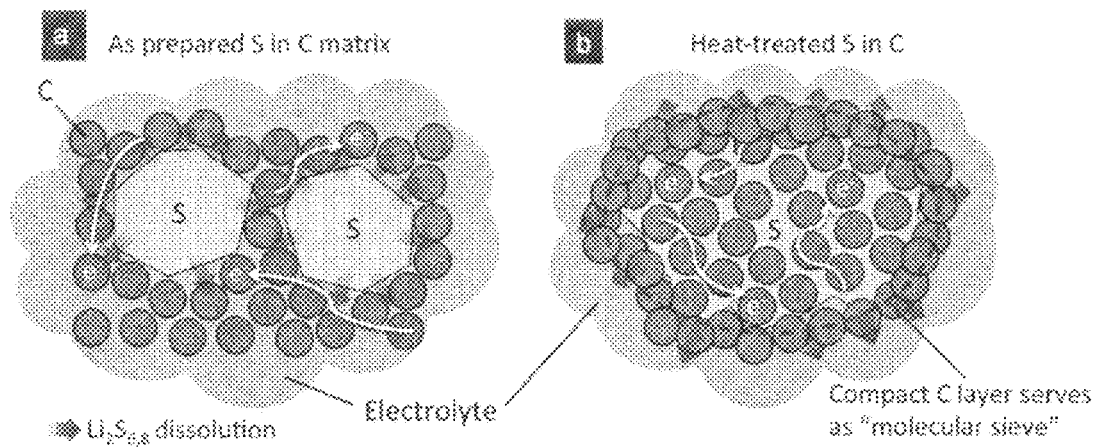
FIG. 15 Illustration of the reaction mechanism during the charging and discharging. a) The commercial sulfur particle exhibits more pathways of lithium polysulfide/electrolyte contact, while b), the generated carbon-rich layer reduces the solid (matrix)/liquid (electrolyte) interface thus prevents the major loss of active material sulfur.

Next, we investigated the morphological evolution of the electrode surface during lithiation/delithiation. As can be seen from FIG. 10a, the surface of the original commercial sulfur is quite smooth. A clear boundary between sulfur and other materials like carbon and binder is observed via elemental mapping (FIG. 10b). However after only two cycles, several holes with size 2-4 μm were observed in the sulfur particles, which by then were already severely deformed and shrunk, indicating a fast loss of the active sulfur (FIG. 10c-d and FIG. 11). The sulfur particles were dramatically deformed and broke into small particles which were dispersed among the surface inhomogeneously (FIG. 11). In contrast, the surface of the SULFUN electrode is still smooth after the cycling, as shown in FIG. 10e. The elemental sulfur map indicates a homogeneous distribution (FIG. 10f). From analysis of the cross-section of the pure sulfur electrode, O and F which can only be precipitated out from the electrolyte was found to be dispersed across the whole electrode film (~40 μm, FIG. 12a), indicating deep invasion of the liquid electrolyte and corrosion of the sulfur. However, the O and F elements were highly concentrated at the top surface (1-2 μm) with the SULFUN electrode (FIGS. 12b and 13), indicating liquid electrolyte invasion and corrosion were probably repelled from the inside matrix. The corrosion reaction is believed to be heterogeneous and anisotropic, as illustrated in FIGS. 14a and 15a. Some locations will be more heavily corroded and consequently generate holes/cracks, causing the whole particle to split (FIG. 14a). The electrode surface composed of pure or milled sulfur displays a larger solid-liquid interface $S_{contact}$ to the liquid electrolyte but with a smaller volume of sulfur $V_s$ (FIG. 14b and FIG. 15a). In this case, the liquid electrolyte can easily permeate into the electrode (FIG. 12a), which also creates a path to carry away the soluble polysulfides. However, the compactly nanostructured SULFUN exposes only a very small area of naked sulfur to the liquid electrolyte (FIGS. 14c and 15b) limiting the sulfur dissolution, even when the intermediate lithium polysulfides are formed inside. Here a possible mechanism is suggested. Because the Snet is initially open to the outside, the LiTFSI+ DOL+DME liquid electrolyte wets and infiltrates Snet in the initial lithiation, dissolving some sulfur and forming some soluble lithium polysulfides. The "wet" Snet then has some significant Li$^+$ conductivity that percolates within Cnet. However, once the embedded sulfur on the top is dispersed, the carbon nanoparticles remaining (tens to hundreds nanometers, as shown in FIGS. 12b and 13) concentrates to form a dense carbon-rich layer as a passivation layer against corrosion, which serves like a sieve to selectively block larger molecules such as the electrolyte and polysulfide while allowing small charged species (Li$^+$/e$^-$) to pass through (FIGS. 14c and 15).

Figure 16:
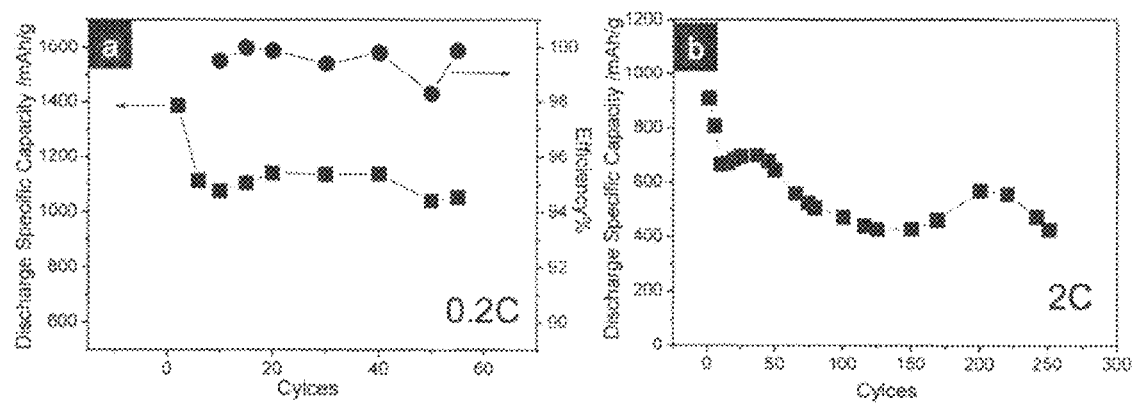
FIG. 16 shows electrochemical cycling performance of modified SULFUN coin-cell batteries at (a) C-rate of 0.2 and (b) C-rate of 2.0. (a) also shows Coulombic efficiency at 0.2 C-rate.

An additional carbon layer with tens of microns thickness was coated on the SULFUN surface. FIG. 16 shows the cycling performance and coulombic efficiency of the modified SULFUN battery at different charge/discharge rates. As can be seen from FIG. 16a, an initial >1300 mAh/g capacity was achieved and then was maintained at a value of ~1100 mAh/g until 60 cycles, accompanying with the coulombic efficiency >98%. Under the 10 times faster charging/discharging (2.0 C), a special discharge capacity of ~400 mAh/g was still attained after 250 cycles (FIG. 16b). This high rate capability indicates the extra carbon can act as a passivation layer to reduce the "shuttling effect", as the in-situ formed carbon-rich passivation layer on SULFUN surface, leading to a long battery life.

Figure 18:
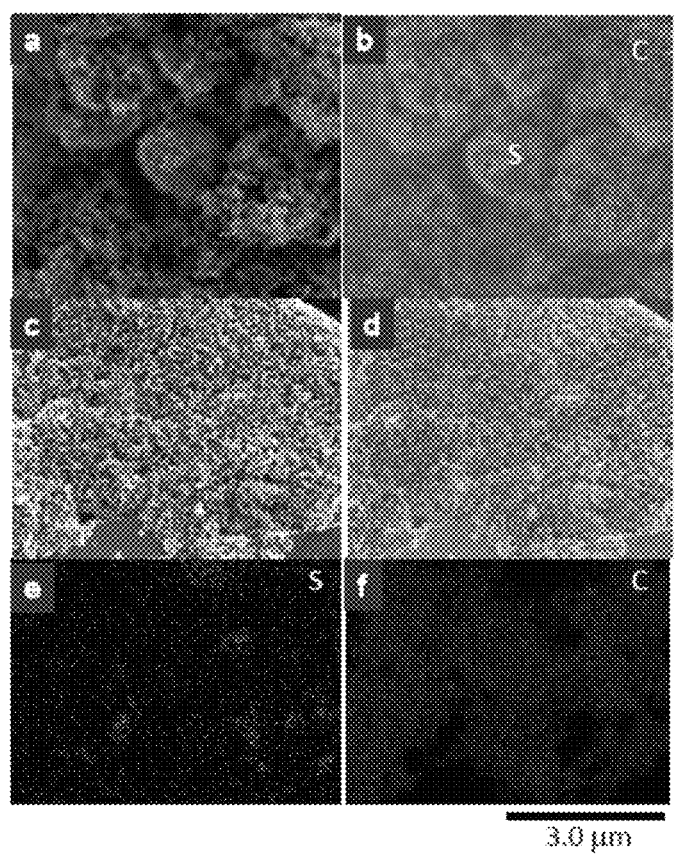
FIG. 18 SEM images and energy-dispersive X-ray spectroscopy (EDS) maps of the sulfur-carbon matrix. (a) SEM morphology of the sulfur-carbon matrix before annealing at 200° C. for 2.5 hours. (b) Sulfur and carbon EDS map of area shown in (a). (c) SEM morphology of the sulfur-carbon matrix after annealing at 200° C. for 2.5 hours. (d)-(f) Sulfur and carbon EDS map of area shown in (c).

To better understand the microstructure of the samples, FIG. 17 shows XRD patterns of raw sulfur, annealed sulfur-carbon matrices, and the SULFUN matrix after 7 charge/discharge cycles ending in charging. In addition, FIG. 18 shows SEM images and energy-dispersive X-ray spectroscopy (EDS) maps of the sulfur-carbon matrix: (a) SEM morphology of the sulfur-carbon matrix before annealing at 200° C. for 2.5 hours. (b) Sulfur and carbon EDS map of area shown in (a). (c) SEM morphology of the sulfur-carbon matrix after annealing at 200° C. for 2.5 hours. (d)-(f) Sulfur and carbon EDS map of area shown in (c).

Figure 19:
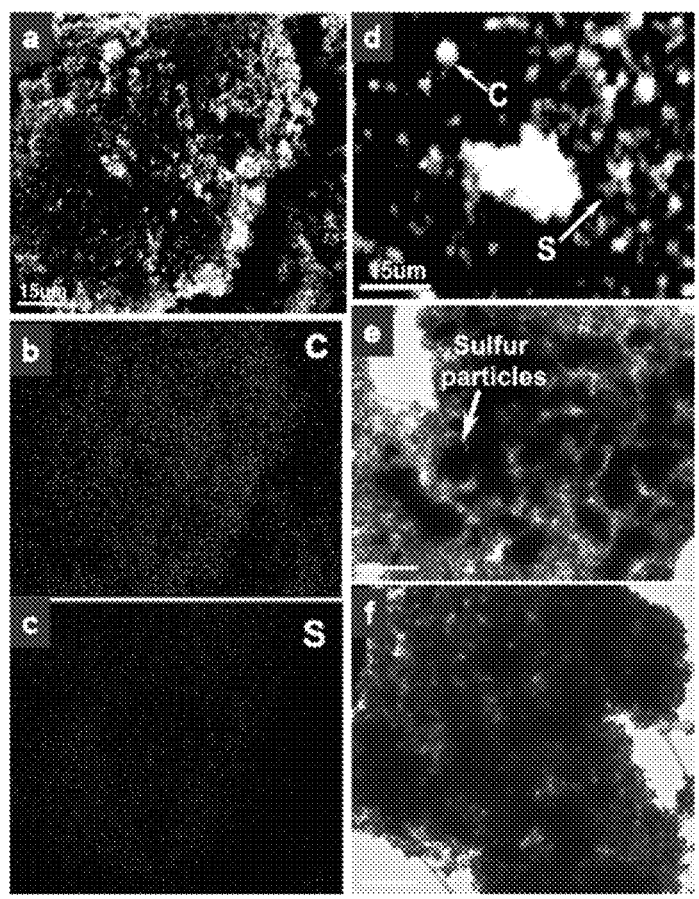
FIG. 19 EDS maps and TEM images of the sulfur-carbon matrix. (a) SEM morphology of the matrix annealed at 150° C. for 50 hours. (b) carbon map of the area shown in (a). (c) sulfur map of the area shown in (a). (d) sulfur and carbon map of as-receive sulfur-carbon matrix before heating. (e) TEM image of the sulfur-carbon matrix before heating at 200° C. for 2.5 hours. (f) TEM image of the sulfur-carbon matrix after heating at 200° C. for 2.5 hours. Scale bar in (e) and (f) is 5 μm.

Additional micrographs are shown in FIG. 19, which includes EDS maps and TEM images of the sulfur-carbon matrix: (a) SEM morphology of the matrix annealed at 150° C. for 50 hours. (b) carbon map of the area shown in (a). (c) sulfur map of the area shown in (a). (d) sulfur and carbon map of as-receive sulfur-carbon matrix before heating. (e) TEM image of the sulfur-carbon matrix before heating at 200° C. for 2.5 hours. (f) TEM image of the sulfur-carbon matrix after heating at 200° C. for 2.5 hours. Scsle bar in (e) and (f) is 5 μm.

To better understand the selective permeation effect, the size dependence of the molecule/ion on the solubility and diffusion coefficient inside the Super-P can be calculated. The mass transport flux is proportional to the product of the solubility and the diffusion coefficient in carbon black, as $$J \sim \frac{k_B T}{6\pi M^{1/2} a} \exp\left(-\frac{Q}{k_B T}\right), \qquad (1)$$

where $k_B$ is the Boltzmann constant, T is temperature, M and a are the mass and the average radius of the molecule/particle, respectively. Q is the effective activation energy, combining both insertion energy and migration energy barrier. When a molecule/ion in the liquid electrolyte is inserted into and diffuses inside the passivation layer, both interfacial and elastic energies contribute to Q:

$$Q \approx F_{surface} + F_{elastic} = 4\pi a^2 \gamma + \frac{24\pi a^3 \mu K \varepsilon^2}{3K + 4\mu}, \qquad (2)$$

where γ is the interfacial energy, K, μ and ε are the bulk modulus, shear modulus and dilatational misfit strain, respectively. For small particles such as single lithium ion, molecular sulfur/polysulfide ion, or even electrolyte, $F_{surface} \gg F_{elastic}$, and eq. (2) becomes Q≈Sγ. Here, S is the surface area. The average surface energy of SuperP is ~100 mJ/m$^2$ and the surface area of Li ion, small sulfur molecules $S_4$ and $S_8$ can be estimated using lithium ion radius of 1.34 Å and the bond length values of various small sulfur molecules. Thus, from eq. (1) and (2) the ratio of permeation fluxes J(X) (X=Li, $S_4$, $S_8$) as J(Li):J($S_4$):J($S_8$)=1:10$^{-3}$:10$^{-8}$ is obtained, showing the permeation of the $S_8$ cluster is eight orders of magnitude slower than Li. The upshot of the above rough estimation is that a pure carbon layer (blocking the invasion of the liquid electrolyte into Snet) can selectively allow Li$^+$/e$^-$ to easily get in, but prevent the larger polysulfides Li$_2$S$_X$ (4≤X≤8) from getting in or out, thus slowing down the shuttling effect and act as a passivating molecular sieve. Also, the fine-meshed Cnet will probably restrain and block much smaller sulfur particles from breaking off Snet mechanically and convecting into the liquid, even with a certain degree of heterogeneous corrosion. In other words, the SULFUN nanocomposite can better facilitate stress relaxation and enhance flaw tolerance, which may be a generic behavior of nano-scale electrode materials.

In conclusion, the in-situ synthesized sulfur-carbon nanosponge using Conductive Carbon Blacks as a host greatly slowed down the loss of sulfur, hereby displaying a better cycling performance while maintaining a high capacity. The suggested passivation layer or extra carbon layers can prevent the decay of capacity by limiting the transport of the larger polysulfides Li$_2$S$_X$ (4≤X≤8) without slowing down Li$^+$/e$^-$. This "defense-in-depth" strategy is distinct from the complete encapsulation or the "defense-in-perimeter" strategy most researchers have employed. The improved coin-cell scale performance discussed herein indicates that the polysulfides shuttling effect is ameliorable through nanostructural design and engineering. The high capacity, long cyclability, cheap raw materials and simple preparation make the SULFUN cathode material suitable for industrial scale production.

Characterization of Battery Performance

Battery behavior of the synthesized material was performed via a coin cell. Typically, a CR2032 coin cell (MTI) with a lithium foil as counter/reference electrode was assembled in an argon-filled glove box (LABmaster SP, MBraun) with both O$_2$ and H$_2$O concentrations lower than 0.1 ppm. Celgard 2400 was used as the separator. For liquid electrolyte, 1.0 M lithium bis-trifluoromethanesulfonylimide in 1,3-dioxolane and 1,2-dimethoxyethane (volume ratio 1:1, Novolyte) was employed, although the skilled artisan will recognize that other electrolytes such as those containing lithium salts (e.g., LiPF$_6$, LiBF$_4$ or LiClO$_4$) and combination of linear and cyclic carbonates (e.g., ethylene carbonate, dimethyl carbonate or poly(oxyethylene)) can also suitably be employed. Certain relevant battery performance characteristics were tested without additives except the rate data shown in FIG. 7. A hydraulic crimping machine (MSK-110, MTI) was employed to close the cell. To make a slurry, the active material of sulfur-Super P sponge, or pure sulfur synthesized using a same method but without carbon, or milled sulfur/carbon mixture was blended with 10 wt % Super C65 (Timical), 10 wt % poly (vinylidene fluoride) binder (MTI), and a small amount of polypyrrole solution (polypyrrole doped, 5 wt % dispersion in H$_2$O, conductivity of dried cast film: >0.0005 S/cm, Sigma-Aldrich) dissolved in N-methylpyrrolidone (MTI). The sulfur loading was designed to be 1.0 mg/cm$^2$ for 150° C. sample and 2.0 mg/cm$^2$ for 200° C. sample, respectively. The mixture was sonicated until a homogeneous slurry was formed. Then the slurry was coated onto an aluminum foil current collector. After drying 2 hours at 90° C. in an oven, the sample was cut out to serve as a cathode.

For the high-rate charge/discharge test, an additional layer which is composed of carbon/binder was coated on the top of the dried slurry made of SULFUN. In a typical experiment, the melted sulfur/carbon mixture with 10 wt % SuperP and 10 wt % poly (vinylidene fluoride) binder was first coated on the aluminum foil, as described above. After the first slurry was almost dried, the secondary slurry composed of SuperP (80 wt %) and binder (20 wt %) with a loading of ~2.0 mg/cm$^2$ was coated on the surface. Then the sample was dried overnight at 65° C. in an oven for battery assembling.

The packed coin cell was galvanostatically charged/discharged in a fixed voltage window between 1.4 and 2.5/2.8 V on a 12-channel Arbin Instruments BT2000 battery tester at room temperature. The cycling capability was recorded at a charging/discharging rate of 0.2 C and 2.0 C, respectively. The specific capacities were calculated based on the sulfur loading corrected by the TGA test.

We claim:
1. A method comprising:
    functionalizing the surface of conductive carbon black particles, thereby forming hydroxyl and/or carboxyl groups on the surface of the conductive carbon black particles;
    dispersing a mixture comprising sulfur particles and at least one surfactant in a matrix of the functionalized conductive carbon black particles; and
    heating the dispersed sulfur particles and functionalized conductive carbon black particles for a time and to a temperature above the melting point of sulfur, whereby the sulfur forms a coating over the functionalized conductive carbon black particles to form a nanostructured sponge having a sulfur-covering-carbon structure.
2. The method of claim 1, wherein said functionalizing comprises contacting the conductive carbon black particles with acid.
3. The method of claim 1, wherein the sulfur particles are formed in-situ in the functionalized conductive carbon black by reducing a water-soluble sulfur-containing compound.
4. The method of claim 3, wherein said dispersing comprises agitating in an aqueous solution, the functionalized conductive carbon black particles, an acid, the at least one surfactant and thiosulfate, whereby the thiosulfate forms the sulfur particles.
5. The method of claim 4, further comprising isolating and drying the mixture of functionalized conductive carbon black particles and sulfur particles.
6. The method of claim 1, wherein said heating is at a temperature ranging from about 150 to about 200° C.
7. The method of claim 6, wherein said heating is carried out for a time ranging from about 2 to about 50 hours.
8. The method of claim 1, wherein the sulfur coating is no thicker than 1 micron.
9. The method of claim 1, wherein the conductive carbon black particles have a BET surface area ranging from about 40 to about 80 m$^2$/g.
10. The method of claim 1, wherein said dispersing further comprises forming carbon-sulfur clusters having a size of about 2 μm to about 4 μm, and said heating comprises melting the sulfur particles to form the coating over the functionalized conductive carbon black particles.
11. The method of claim 1, wherein said dispersing comprises adding the mixture comprising the sulfur particles and the at least one surfactant into the matrix of the functionalized conductive carbon black particles in a drop-by-drop manner.
12. The method of claim 11, wherein said adding is at a dropping speed of about 1 mL/min under ultrasonic agitation.
13. The method of claim 1, wherein the conductive carbon black particles have a particle size of about 80 nm to about 800 nm.
14. The method of claim 1, wherein the conductive carbon black particles have a particle size of about 70 nm.

15. The method of claim 1, wherein the coating formed over the functionalized conductive carbon black particles during said heating includes amorphous sulfur.

16. The method of claim 1, further comprising:
   coating a carbon layer on the surface of the nanostructured sponge.

17. The method of claim 16, wherein the carbon layer has a thickness of about 10 μm or greater.

* * * * *